Figure 1:
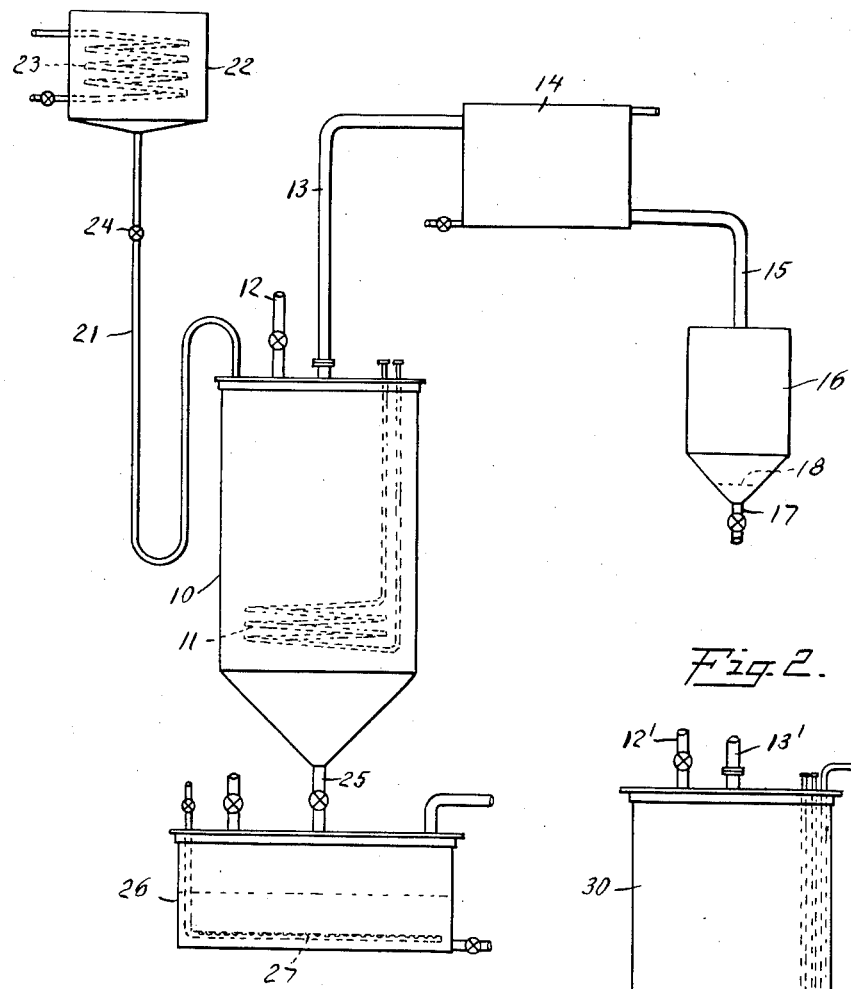

Aug. 15, 1933.   C. L. MASTERS   1,922,813
2-NAPHTHALENEMONOSULPHONIC ACID
Filed Sept. 15, 1932

INVENTOR
Carl L. Masters
BY
ATTORNEY

Patented Aug. 15, 1933

1,922,813

UNITED STATES PATENT OFFICE 1,922,813

2-NAPHTHALENEMONOSULPHONIC ACID

Carl L. Masters, Orchard Park, N. Y., assignor to National Aniline & Chemical Company, Inc., New York, N. Y., a Corporation of New York Application September 15, 1932
Serial No. 633,362

19 Claims. (Cl. 260—159)

This invention relates to the obtainment of 2-naphthalenemonosulphonic acid from mixtures of 2-naphthalenemonosulphonic acid and 1-naphthalenemonosulphonic acid. It relates more particularly to an improved method of obtaining 2-naphthalenemonosulphonic acid from reaction mixtures resulting from the monosulphonation of naphthalene at an elevated temperature.

Beta-naphthol (2-naphthol) which is a well known organic product useful in the making of dyestuffs and other materials, is generally obtained in practice by fusing 2-naphthalenemonosulphonic acid with caustic alkali. The 2-naphthalenemonosulphonic acid is generally produced from naphthalene by sulphonation, as by heating it with concentrated sulphuric acid. As ordinarily obtained, the crude 2-naphthalenemonosulphonic acid resulting from the sulphonation contains amounts of 1-naphthalenemonosulphonic acid varying up to 20 per cent, thereof, as well as small amounts of naphthalenedisulphonic acids, residual naphthalene and other impurities. When this mixture is fused with caustic alkali for the production of naphthol, the 1-naphthalenemonosulphonic acid is also converted to its corresponding naphthol (1-naphthol). While the presence of the 1-naphthol in the 2-naphthol is not objectionable for some purposes, it is frequently desirable, and even necessary, in the manufacture of certain derivatives of 2-naphthol that only very little (a fraction of a per cent.), if any, 1-naphthol be present.

Various processes have heretofore been proposed for the elimination of 1-naphthol from 2-naphthol, as for example, fractional distillation. Such processes are not commercially satisfactory, however, owing to the labor and equipment cost and the high content of residual 1-naphthol resulting therefrom.

It has also been proposed to separate 1-naphthalenemonosulphonic acid from the 2-naphtholenemonosulphonic acid resulting from the sulphonation of naphthalene at an elevated temperature by salting out the 2-naphthalenemonosulphonic acid from the sulphonation reaction mixture with common salt, sodium sulphate or sodium sulphite, and separating from the resulting precipitated salt of 2-naphthalenemonosulphonic acid the mother liquor which retains a considerable portion of the 1-naphthalenemonosulphonic acid. In this case also, however, the separation is not complete, and the quantity of 1-naphthalenemonosulphonic acid present in the product, and consequently the amount of 1-naphthol present in the 2-naphthol produced upon subjecting the 2-naphthalenemonosulphonic acid to a caustic fusion, is greater than is desirable for many purposes or uses.

An object of the present invention is to provide a simple and efficient method whereby large yields of 2-naphthalenemonosulphonic acid of good quality and containing minimum amounts of 1-naphthalenemonosulphonic acid may be obtained from mixtures of 2-naphthalenmonosulphonic acid and 1-naphthalenemonosulphonic acid.

Another object of the present invention is to provide a rapid, simple and efficient method whereby large yields of 2-naphthalenemonosulphonic acid suitable for the production of 2-naphthol which contains a minimum amount of 1-naphthol may be obtained from a reaction mixture resulting from the monosulphonation of naphthalene with sulphuric acid at an elevated temperature.

Other objects of the invention will in part be obvious and will in part appear hereinafter.

I have found, according to the present invention, when crude 2-naphthalenemonosulphonic acid containing 1-naphthalenemonosulphonic acid in admixture therewith is heated with water in the presence of sulphuric acid at a temperature maintained within the range 145°–155° C., and preferably at 149°–151° C., that the 1-naphthalenemonosulphonic acid is decomposed by hydrolysis, resulting in the formation of sulphuric acid and naphthalene. The naphthalene is preferably removed inasmuch as the hydrolysis reaction is reversible and does not go to completion in the presence of an excessive quantity of naphtholene.

I have furthermore found, in accordance with the present invention, that the naphthalene can be removed from the reaction mixture above referred to during the hydrolysis, and the temperature can be maintained within the desired limits, by distilling a mixture of naphthalene and water vapors from a boiling mixture of said crude 2-naphthalenemonosulphonic acid with sulphuric acid of a strength and in an amount such that the mixture boils under the prevailing pressure conditions within the range 145°–155° C., and preferably 149°–151° C.; and, during the distillation, adjusting the concentration of the boiling mixture so as to maintain its boiling point within said range. By employing mixtures of such concentrations that their boiling point range lies within the desired temperature range and by maintaining the concentration within said limits, careful regulation of the heat supplied to the reaction mixture and close supervision of the reaction mixture are not necessary. The hydrolysis reaction results in the formation of sulphuric acid, which remains in the reaction mixture to a large extent, and both the hydrolysis reaction and the distillation of water remove water from the reaction mixture, all of which tends to produce an increase in the concentrations of the sulphuric acid and of the 2-naphthalenemonosulphonic acid and consequently a rise in the boiling point of the reaction mixture. By compensating the reaction mixture for the loss of water, as by adding to it regulated amounts of water (in the form of liquid, vapor or more dilute sulphuric acid) during the course of the reaction, the boiling point of the reaction mixture may be readily maintained within the desired temperature range. Furthermore, the addition of water to the reaction mixture may be correlated with the rate of distillation of water and naphthalene from the reaction mixture. It is then merely necessary to supply heat in an amount sufficient to maintain the mixture at its boiling temperature, and control of the reaction temperature is then substantially automatic; since the temperature of the mixture cannot rise above its boiling point. Only a small amount of the 2-naphthalenemonosulphonic acid is lost by decomposition or hydrolysis, and only a small amount of disulphonic acids and other by-products are formed; so that the yield and purity of the 2-naphthalenemonosulphonic acid recovered from the hydrolysis reaction mixture are relatively high. Furthermore, the decomposition or hydrolysis of 1-naphthalenemonosulphonic acid progresses to such an extent in a relatively short period of time that, upon salting out the 2-naphthalenemonosulphonic acid from the hydrolyzed mixture and fusing it with caustic alkali, 2-naphthol is obtained which contains only such amounts of 1-naphthol as do not interfere with the use of the 2-naphthol for those purposes where the presence of 1-naphthol is undesirable.

I have also found, in accordance with the present invention, that the time required to complete the hydrolysis is decreased, that excessive local overheating (which results in the formation of naphthalenedisulphonic acids and other by-products) is further decreased, that less costly apparatus may be employed, and that consequently a higher yield of a purer 2-naphthalenemonosulphonic acid may be obtained at a lower cost by supplying the heat and the water employed in carrying out the hydrolysis in the form of either wet or dry steam introduced directly into the hydrolysis reaction mixture.

The invention accordingly comprises the steps and the relation of each with others thereof which will be exemplified in the process hereinafter disclosed. The scope of the invention will be indicated in the claims.

In the practice of the present invention in accordance with a preferred method of procedure, crude 2-naphthalenemonosulphonic acid, containing 1-naphthalenemonosulphonic acid as a major impurity, may be heated in the presence of aqueous sulphuric acid to the boiling point of the mixture and, while continuing the boiling, vapors of naphthalene and water may be withdrawn. The proportions of crude 2-naphthalenemonosulphonic acid and sulphuric acid and the concentration of sulphuric acid employed preferably should be such that the boiling point of the mixture lies within the range 145°–155° C., and preferably within the range 149°–151° C. or about 150° C. Mixtures containing 55 to 65 per cent. of naphthalene sulphonic acids (of which acids preferably not less than three-fourths is 2-naphthalenemonosulphonic acid), 18 to 25 per cent. of sulphuric acid, and the rest principally water are particularly suitable for treatment in accordance with this process. During the course of the reaction, water may be added to the reaction mixture in amounts required to maintain the boiling point within the said temperature range. Water and naphthalene vapor which are withdrawn from the mixture may be condensed and recovered. The boiling or distillation may be continued until the desired removal of 1-naphthalenemonosulphonic acid by hydrolysis has been effected, and the 2-naphthalenemonosulphonic acid may then be recovered from the resulting mixture in any suitable manner; as for example, by salting it out with any suitable salt, for example, sodium chloride, sodium sulphate, sodium sulphite, etc.

The naphthalene resulting from the hydrolysis may be removed from the reaction mixture in any suitable manner. Thus, it may be distilled with water (steam distilled) and the resulting vapor mixture may be drawn off and condensed. It may also be removed by passing an inert gas through the reaction mixture; for example, a stream of nitrogen, $CO_2$, steam, or other inert gas may be passed through the reaction mixture, and the resulting mixture of gas and vapors may be subjected to condensation to recover the naphthalene. Furthermore, the heat required for carrying out the reaction may be supplied to the reaction mixture by the inert gas, which may be preheated for this purpose to a suitable temperature, and the water employed to maintain the concentration of the reaction mixture within the desired limits also may be supplied to the reaction mixture in the form of water vapor carried by the stream of inert gas; as for example, superheated steam, wet steam under suitable pressure, heated nitrogen containing moisture, etc.

The crude 2-naphthalenemonosulphonic acid employed in the practice of the present invention may be produced in any suitable manner. The invention, however, is particularly adapted for the removal of 1-naphthalenemonosulphonic acid from crude 2-naphthalenemonosulphonic acids resulting from the sulphonation of naphthalene with sulphuric acid at an elevated temperature and containing 1-naphthalenemonosulphonic acid as the chief impurity. Moreover, since the reaction mixtures resulting from such sulphonations generally contain residual sulphuric acid and since sulphuric acid is employed in carrying out the hydrolysis, the crude reaction mixtures resulting from the sulphonation may be themselves subjected to the hydrolysis, after a preliminary adjustment of the acid concentration, if necessary, such that the boiling points of the mixtures lie within the temperature range at which it is desired to carry out the hydrolysis. Thus, the process of the present invention may be advantageously applied to the diluted sulphonation reaction mixture produced by rapidly adding 1400 lbs. of concentrated sulphuric acid (66° Bé.) to 1000 lbs. of well-stirred molten naphthalene maintained at a temperature of 130° C.; heating the mixture, after all the sulphuric acid has been added, and maintaining it at 130° C. until sulphonation is substantially completed; and adding the resulting reaction mass to a sufficient amount of water to produce a mixture boiling at about 149° to about 151° C. at normal atmospheric pressure (about 260 lbs. of water). The resulting diluted sulphonation reaction mixture contains about 55 per cent. to about 65 per cent. of crude 2-naphthalenemonosulphonic acid (of which about one-fourth to one-eighth is 1-naphthalenemonosulphonic acid), 18 per cent. to 25 per cent. sulphuric acid ($H_2SO_4$) and the rest water. It has a boiling point at normal atmospheric pressure of about 150° C.

Figure 2:
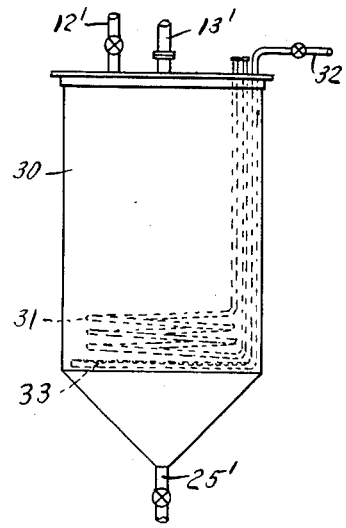

The invention will be further described in connection with the apparatus illustrated in the accompanying drawing in which Fig. 1 is a diagrammatic representation of an apparatus suitable for carrying out one modification of the process; and Fig. 2 is an elevation of a modified form of hydrolyzer suitable for carrying out another modification of the process of the invention.

Referring to Fig. 1 of the drawing, a closed hydrolyzer 10, provided with an agitator (not shown) and an internal heating coil 11, is charged through a supply pipe 12 with a sulphuric acid solution of crude 2-naphthalenemonosulphonic acid, containing 1-naphthalenemonosulphonic acid as an impurity and having a boiling point of about 150° C., as for example the diluted sulphonation reaction mixture above described. Heat is supplied to the mixture by the coil 11, as for example by circulating steam through said coil, whereby the temperature of the mixture is raised to its boiling point and active boiling is produced. Vapors of naphthalene and water distilled from the boiling mixture are withdrawn from the hydrolyzer through a pipe 13 to a condenser 14 which is maintained at a suitable temperature above the melting point of naphthalene to prevent solidification of the naphthalene therein, as for example by heated water circulating through said condenser. The resulting liquid condensate is withdrawn from the condenser through pipe 15 and discharged into tank 16 provided with a bottom discharge outlet 17 and a screen 18 for retaining solid naphthalene particles. The naphthalene solidifies in the tank 16 and remains upon the screen 18 when the water is drawn off from the tank 16 through the discharge 17.

As a result of the reaction which takes place in the hydrolyzer 10, water combines with the 1-naphthalenemonosulphonic acid and to a slight extent with the 2-naphthalenemonosulphonic acid, forming naphthalene and sulphuric acid. The resulting removal of water from the reaction mixture and addition of sulphuric acid, as well as the distillation of water with the naphthalene, tend to increase the concentration of the 2-naphthalenemonosulphonic acid and sulphuric acid in the mixture, and consequently to raise the boiling point of the mixture. In order to maintain the acid concentration of the reaction mixture within the desired limits so that the boiling point of the mixture will be held within the desired temperature range, water is continuously or intermittently supplied to the mixture in the hydrolyzer 10, during the reaction, in amounts adapted to maintain the desired acid concentration of the mixture.

In accordance with the embodiment of the invention carried out in the apparatus shown in Fig. 1 of the drawing, water is supplied to the hydrolyzer 10 through a valved pipe 21 connected with a water tank 22, which is preferably provided with suitable means for preheating the water, such as coil 23. The valve 24 in pipe 21 is preferably adjusted so that a fine stream of water drips into the hydrolyzer, during the reaction, at a rate which will maintain the boiling point of the mixture within the range 149°–151° C. The hydrolysis process is continued until the desired elimination of 1-naphthalenemonosulphonic acid has been effected (about 3 to 3.5 hours with the above diluted sulphonation reaction mixture). The resulting mixture is then discharged from the hydrolyzer through discharge outlet 25 into a dilution vat 26 containing water, and air is blown through the diluted mixture from perforated coil 27 to remove residual naphthalene. The purified 2-naphthalenemonosulphonic acid is then salted out from the resulting solution by means of sodium sulphate or sodium sulphite, and separated from the mother liquor in any suitable manner as by filtration.

In accordance with the embodiment of the invention carried out in connection with the apparatus shown in Fig. 2 of the drawing, the sulphuric acid solution of crude 2-naphthalenemonosulphonic acid above referred to, is charged into a hydrolyzer 30 provided with suitable indirect heating means, such as a heating coil 31, by a supply pipe 12', and the mixture is heated by indirect heat supplied through the coil 31 until the boiling point of the mixture is reached (about 150° C.). Steam under pressure or superheated steam is then introduced directly into the mixture in the hydrolyzer 30 through a pipe 32 terminating in a perforated coil 33, or other suitable means, whereby hydrolysis of the 1-naphthalenemonosulphonic acid is effected. Water and naphthalene vapors are distilled from the mixture and are withdrawn through pipe 13' from which they pass to a condenser, as above described in connection with the apparatus of Fig. 1. The steam is preferably introduced into the reaction mixture at a temperature a few degrees (2°–5° C.) above the temperature at which it is desired to maintain the boiling point of the mixture. Thus, employing the above diluted sulphonation reaction mixture, live saturated or dry steam at about 60 pounds gauge pressure (about 153° C.) is introduced into the hydrolyzer 30 at a rate which will maintain the mixture boiling within the temperature range 149°–151° C. In this manner, the heat required for the reaction and the water required to maintain the desired concentration are both directly supplied to the hydrolysis reaction mixture. The introduced steam not only serves to maintain the desired temperature and concentration of the hydrolysis reaction mixture but it also serves to carry or drive the naphthalene, resulting from the hydrolysis, out of the reaction mixture substantially as fast as it is formed and thereby aids in promoting the reaction. A sufficient quantity of steam is automatically absorbed or condensed to maintain the temperature substantially constant. After the boiling of the hydrolysis reaction mixture and introduction of steam have been initiated, the indirect supply of heat to the reaction mixture by the heating coil 31 may be discontinued. As a result, local overheating of the reaction mass is avoided, thereby reducing local formation of disulphonic acids as well as local hydrolysis of 2-naphthalenemonosulphonic acid, both of which are promoted by the higher temperatures at which the indirect heating means must be maintained in order to supply adequate heat to the reaction mixture. The introduction of the steam under pressure into the reaction mixture through a perforated coil results in the passage of fine jets of steam through the mass thereby agitating it and serving to maintain it in homogeneous condition. Preferably, an agitator (not shown) is also provided in order to maintain the hydrolysis reaction mixture substantially uniform. The introduction of steam and boiling of the mixture are thus continued until the desired hydrolysis of the 1-naphthalenemonosulphonic acid has been completed (about 2 hours). The reaction mixture may then be further treated for the recovery of the 2-naphthalenemonosulphonic acid, as for example in the manner above described.

The naphthalene which is recovered from the distillate may be used for the production of additional crude 2-naphthalenemonosulphonic acid by sulphonation, and the condensed water may be used as diluting water, if desired.

It will be realized by those skilled in the art that the invention is not limited to the details of the above description, but that changes may be made in the method of procedure, reaction conditions, materials treated, proportion of ingredients, order of steps and other details of the process without departing from the invention. It will also be understood that apparatus other than that shown in the drawing and/or described above, may be employed in carrying out the process. The invention is accordingly to be accorded a scope commensurate with the appended patent claims as limited only by the prior art.

I claim:

1. The method of producing 2-naphthalenemonosulphonic acid from a 2-naphthalenemonosulphonic acid containing 1-naphthalenemonosulphonic acid in admixture therewith which comprises heating a reaction mixture containing said 2-naphthalenemonosulphonic acid, sulphuric acid and water at a temperature maintained within the range 145°–155° C., whereby said 1-naphthalenemonosulphonic acid is decomposed by hydrolysis.

2. The method of producing 2-naphthalenemonosulphonic acid from a 2-naphthalenemonosulphonic acid containing 1-naphthalenemonosulphonic acid in admixture therewith which comprises heating a reaction mixture containing said 2-naphthalenemonosulphonic acid, sulphuric acid and water at a temperature maintained within the range 149°–151° C., whereby said 1-naphthalenemonosulphonic acid is decomposed by hydrolysis.

3. The method of producing 2-naphthalenemonosulphonic acid from a 2-naphthalenemonosulphonic acid containing 1-naphthalenemonosulphonic acid in admixture therewith which ric acid and water at a temperature maintained said 2-naphthalenemonosulphonic acid, sulphuric acid and water at a temperature maintained within the range 145°–155° C. while removing naphthalene from the reaction mixture, whereby said 1-naphthalenemonosulphonic acid is decomposed by hydrolysis.

4. The method of producing 2-naphthalenemonosulphonic acid from a 2-naphthalenemonosulphonic acid containing 1-naphthalenemonosulphonic acid in admixture therewith which comprises heating a reaction mixture containing said 2-naphthalenemonosulphonic acid, sulphuric acid and water at a temperature maintained within the range 145°–155° C., whereby said 1-naphthalenemonosulphonic acid is decomposed by hydrolysis, and passing an inert gas through said reaction mixture to remove naphthalene therefrom.

5. The method of producing 2-naphthalenemonosulphonic acid from a 2-naphthalenemonosulphonic acid containing 1-naphthalenemonosulphonic acid in admixture therewith which comprises boiling said 2-naphthalenemonosulphonic acid with sulphuric acid and water at a temperature maintained within the range 145°–155° C., whereby said 1-naphthalenemonosulphonic acid is decomposed by hydrolysis.

6. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulfuric acid and water, which mixture has a boiling point within the range 145°–155° C., whereby said 1-naphthalenemonosulphonic acid is decomposed by hydrolysis.

7. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture has a boiling point within the range 145°–155° C., whereby said 1-naphthalenemonosulphonic acid is decomposed by hydrolysis, withdrawing naphthalene vapor from the reaction mixture, and during the reaction adjusting the concentration of the reaction mixture so as to maintain its boiling point within said range.

8. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture has a boiling point within the range 145°–155° C., whereby said 1-naphthalenemonosulphonic acid is decomposed by hydrolysis, withdrawing naphthalene and water vapors from the reaction mixture, and maintaining the boiling point of said reaction mixture within said temperature range by adding water to said boiling mixture.

9. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture has a boiling point within the range 145°–155° C., whereby said 1-naphthalenemonosulphonic acid is decomposed by hydrolysis, withdrawing naphthalene and water vapors from the reaction mixture, and passing steam into said boiling mixture.

10. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture has a boiling point within the range 149°–151° C., whereby said 1- naphthalenemonosulphonic acid is decomposed by hydrolysis, and withdrawing naphthalene and water vapors from the reaction mixture.

11. The method of producing 2-naphthalene-monosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture has a boiling point within the range 145°–155° C., whereby said 1-naphthalenemonosulphonic acid is decomposed by hydrolysis, withdrawing naphthalene and water vapors from the boiling mixture, and maintaining the mixture boiling within said temperature range by passing steam into said mixture.

12. The method of producing 2-naphthalenemonosulphonic acid from a crude 2-naphthalenemonosulphonic acid containing 1-naphthalenemonosulphonic acid as the chief impurity which comprises boiling a mixture of said crude 2-naphthalenemonosulphonic acid, sulphuric acid and water, which mixture contains about 60 to about 65 per cent. of the crude 2-naphthalenemonosulphonic acid, about 18 to about 25 per cent. sulphuric acid, and the rest water and boils within the range 145°–155° C., whereby said 1-naphthalenemonosulphonic acid is decomposed by hydrolysis withdrawing naphthalene vapor, and during the reaction adjusting the concentration of the reaction mixture so as to maintain the boiling point of the mixture within said range.

13. The method of producing 2-naphthalenemonosulphonic acid from a crude 2-naphthalenemonosulphonic acid containing 1-naphthalenemonosulphonic acid as the chief impurity which comprises boiling a mixture which contains about 55 to about 65 per cent. of the crude 2-naphthalenemonosulphonic acid, about 20 to about 25 per cent. of sulphuric acid, and the rest water, whereby said 1-naphthalenemonosulphonic acid is decomposed by hydrolysis, and withdrawing naphthalene vapor from the boiling mixture while maintaining the boiling point of the mixture within the range 149°–151° C. by adding water to said boiling mixture.

14. The method of producing 2-naphthalenemonosulphonic acid from a crude 2-naphthalenemonosulphonic acid containing 1-naphthalenemonosulphonic acid as the chief impurity which comprises boiling a mixture which contains about 55 to about 65 per cent. of the crude 2-naphthalenemonosulphonic acid, about 20 to about 25 per cent. of sulphuric acid, and the rest water, whereby said 1-naphthalenemonosulphonic acid is decomposed by hydrolysis, and withdrawing naphthalene vapor from the boiling mixture while maintaining the boiling point of the mixture within the range 149°–151° C. by passing steam into the boiling mixture.

15. The method of producing 2-naphthalenemonosulphonic acid from a 2-naphthalenemonosulphonic acid containing 1-naphthalenemonosulphonic acid in admixture therewith which comprises boiling a 2-naphthalenemonosulphonic acid reaction mixture resulting from the sulphonation of naphthalene with sulphuric acid at an elevated temperature and containing such an amount of water that it has a boiling point within the range 145°–155° C., whereby said 1-naphthalenemonosulphonic acid is decomposed by hydrolysis, withdrawing naphthalene vapor and continuing the boiling while maintaining the boiling point of the reaction mixture within the range 145°–155° C. by adding water to the reaction mixture.

16. The method of producing 2-naphthalenemonosulphonic acid from a crude 2-naphthalenemonosulphonic acid containing 1-naphthalenemonosulphonic acid as the chief impurity which comprises heating at the boiling point a mixture containing about 55 to about 65 per cent. of the crude 2-naphthalenemonosulphonic acid about 20 to 25 per cent. of sulphuric acid, and the rest water, said mixture resulting from the sulphonation of naphthalene with sulphuric acid, and withdrawing naphthalene vapor from the boiling mixture while maintaining the boiling point of said mixture within the range 149°–151° C.

17. The method of producing 2-naphthalenemonosulphonic acid from a crude 2-naphthalenemonosulphonic acid containing 1-naphthalenemonosulphonic acid as the chief impurity which comprises heating at the boiling point a mixture containing about 55 to about 65 per cent. of the crude 2-naphthalenemonosulphonic acid, about 20 to about 25 per cent. of sulphuric acid, and the rest water, said mixture resulting from the sulphonation of naphthalene with sulphuric acid, and withdrawing naphthalene vapor from the boiling mixture while adding to the boiling mixture water in an amount adapted to maintain the boiling point of the mixture within the range 149°–151° C.

18. The method of producing 2-naphthalenemonosulphonic acid from a crude 2-naphthalenemonosulphonic acid containing 1-naphthalenemonosulphonic acid as the chief impurity which comprises heating at the boiling point a mixture containing about 55 to about 65 per cent. of the crude 2-naphthalenemonosulphonic acid, about 20 to about 25 per cent. of sulphuric acid, and the rest water, said mixture resulting from the sulphonation of naphthalene with sulphuric acid, and withdrawing naphthalene vapor from the boiling mixture while passing steam at about 153° C. into said mixture in an amount sufficient to maintain the mixture boiling.

19. The method of producing 2-naphthalenemonosulphonic acid from a 2-naphthalenemonosulphonic acid containing 1-naphthalenemonosulphonic acid in admixture therewith which comprises boiling a 2-naphthalenemonosulphonic acid reaction mixture resulting from the sulphonation of naphthalene with sulphuric acid at an elevated temperature and containing such an amount of water that it has a boiling point within the range 149°–151° C., whereby said 1-naphthalenemonosulphonic acid is decomposed by hydrolysis, continuing the boiling while maintaining the boiling point of said mixture within said temperature range by passing steam into said mixture, and withdrawing vapors of naphthalene and steam from the boiling mixture.

CARL L. MASTERS.

CERTIFICATE OF CORRECTION.

Patent No. 1,922,813.                                                                       August 15, 1933.

CARL L. MASTERS.

It is hereby certified that error appears in the printed specification of the above numbered patent requiring correction as follows: Page 1, line 93, for "naphtholene" read "naphthalene"; page 4, line 65, claim 3, strike out the syllable and words "ric acid and water at a temperature maintained" and insert instead "comprises heating a reaction mixture containing"; and that the said Letters Patent should be read with these corrections therein that the same may conform to the record of the case in the Patent Office.

Signed and sealed this 19th day of September, A. D. 1933.

M. J. Moore.

(Seal)                                                                     Acting Commissioner of Patents.